(12) United States Patent
Xia et al.

(10) Patent No.: US 11,878,716 B2
(45) Date of Patent: Jan. 23, 2024

(54) METHOD AND APPARATUS FOR PLANNING AUTONOMOUS VEHICLE, ELECTRONIC DEVICE AND STORAGE MEDIUM

(71) Applicant: APOLLO INTELLIGENT DRIVING TECHNOLOGY (BEIJING) CO., LTD., Beijing (CN)

(72) Inventors: Zhongpu Xia, Beijing (CN); Yaqin Chen, Beijing (CN); Yifeng Pan, Beijing (CN); Hongye Li, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 113 days.

(21) Appl. No.: 17/123,651

(22) Filed: Dec. 16, 2020

(65) Prior Publication Data
US 2021/0188317 A1      Jun. 24, 2021

(30) Foreign Application Priority Data
Jun. 29, 2020   (CN) .......................... 202010605381.1

(51) Int. Cl.
*B60W 60/00*      (2020.01)
*B60W 30/09*      (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ........ B60W 60/0015; B60W 60/0027; B60W 30/09; B60W 30/0956; B60W 30/18163;
(Continued)

(56) References Cited

U.S. PATENT DOCUMENTS

| 11,192,545 B1 * | 12/2021 | Russell ............. B60W 30/0953 |
| 2010/0004839 A1 * | 1/2010 | Yokoyama ....... G08G 1/096783 701/70 |

(Continued)

FOREIGN PATENT DOCUMENTS

| CN | 103996312 A | 8/2014 |
| CN | 108693869 A | 10/2018 |

(Continued)

OTHER PUBLICATIONS

Machine translation of DE-102007015030-A1 (Year: 2008).*
(Continued)

*Primary Examiner* — Jeff A Burke
*Assistant Examiner* — Mohamad O El Sayah
(74) *Attorney, Agent, or Firm* — Dilworth IP, LLC (57) ABSTRACT

The present application provides a method and apparatus for planning an autonomous vehicle, an electronic device and a storage medium, which relates to the field of autonomous driving. According to the technical solutions of the present application, time points of entering a vehicle-converging area can be accurately predicted according to traveling conditions of two parties, so that a driving behavior of the autonomous vehicle is controlled more accurately. The specific implementation is as follows: acquiring first traveling information of an autonomous vehicle; acquiring second traveling information of at least one obstacle vehicle; predicting a driving intention of the obstacle vehicle according to the acquired second traveling information of the obstacle vehicle; planning a vehicle-converging strategy for the autonomous vehicle according to the first traveling information and the driving intention of the obstacle vehicle; and controlling the autonomous vehicle to travel according to the vehicle-converging strategy.

19 Claims, 5 Drawing Sheets

(51) Int. Cl.
   *B60W 30/095* (2012.01)
   *B60W 30/18* (2012.01)
   *B60W 50/00* (2006.01)

(52) U.S. Cl.
   CPC .. *B60W 30/18163* (2013.01); *B60W 50/0097* (2013.01); *B60W 60/0027* (2020.02); *B60W 30/18154* (2013.01); *B60W 30/18159* (2020.02); *B60W 2520/10* (2013.01); *B60W 2554/404* (2020.02)

(58) Field of Classification Search
   CPC ....... B60W 50/0097; B60W 30/18159; B60W 2554/404; B60W 30/18154; B60W 2520/10
   See application file for complete search history.

(56) References Cited

U.S. PATENT DOCUMENTS

| | | | |
|---|---|---|---|
| 2010/0324775 A1 | 12/2010 | Kermani et al. | |
| 2014/0358841 A1* | 12/2014 | Ono | B60W 30/0956 706/52 |
| 2018/0239361 A1 | 8/2018 | Micks et al. | |
| 2019/0016338 A1* | 1/2019 | Ishioka | G08G 1/167 |
| 2019/0367022 A1 | 12/2019 | Zhao et al. | |
| 2020/0042017 A1 | 2/2020 | Kelkar et al. | |
| 2020/0126415 A1* | 4/2020 | Lin | G08G 1/096775 |
| 2020/0158750 A1 | 5/2020 | Zhou et al. | |
| 2020/0180637 A1 | 6/2020 | Oh et al. | |
| 2020/0298842 A1* | 9/2020 | Takamatsu | B60W 30/09 |
| 2020/0307597 A1* | 10/2020 | Oka | B60W 30/18163 |
| 2020/0326719 A1* | 10/2020 | Tram | G06N 3/006 |
| 2020/0361472 A1* | 11/2020 | Baumgarten | B60W 50/14 |
| 2020/0406892 A1* | 12/2020 | Yu | B60W 30/0953 |
| 2021/0053561 A1* | 2/2021 | Beller | G08G 1/166 |
| 2021/0229656 A1* | 7/2021 | Dax | B60W 30/0956 |

FOREIGN PATENT DOCUMENTS

| | | | | |
|---|---|---|---|---|
| CN | 108725452 | A | 11/2018 | |
| CN | 109582022 | A | 4/2019 | |
| CN | 110390839 | A | 10/2019 | |
| CN | 110910657 | A | 3/2020 | |
| CN | 111044991 | A | 4/2020 | |
| DE | 102007015030 | A1 * | 10/2008 | ............... B60T 7/22 |
| EP | 3637143 | A1 | 4/2020 | |
| JP | 2018144568 | A | 9/2018 | |
| JP | 2019040358 | A | 3/2019 | |
| JP | 2019168964 | A | 10/2019 | |
| JP | 2020060553 | A | 4/2020 | |
| KR | 20170097435 | A | 8/2017 | |
| WO | 2016126315 | A1 | 8/2016 | |

OTHER PUBLICATIONS

Office Action in CN Patent Application No. 202010605381.1 dated Apr. 13, 2021.
First Office Action in JP Patent Application No. 2021-065703 dated Jun. 7, 2022.
European Search Report in EP Patent Application No. 20215435.7 dated Aug. 9, 2021.
First Office Action in KR Patent Application No. 10-2021-0038683 dated Nov. 11, 2022.
Notice of Allowance in KR Patent Application No. 10-2021-0038683 dated Jul. 3, 2023.

* cited by examiner

METHOD AND APPARATUS FOR PLANNING AUTONOMOUS VEHICLE, ELECTRONIC DEVICE AND STORAGE MEDIUM

CROSS-REFERENCE TO RELATED APPLICATIONS

This application claims priority to Chinese Patent Application No. 202010605381.1, filed on Jun. 29, 2020 and entitled "METHOD AND APPARATUS FOR PLANNING AUTONOMOUS VEHICLE, ELECTRONIC DEVICE AND STORAGE MEDIUM", the content of which is hereby incorporated by reference in its entirety.

TECHNICAL FIELD

Embodiments of the present application relate to the field of computer technologies, and in particular, to a method and apparatus for planning an autonomous vehicle, an electronic device and a storage medium, which are applicable to the autonomous vehicle.

BACKGROUND

At present, there are many intersections and large traffic flow on urban roads. When an autonomous vehicle passes through an intersection, particularly turns left at the intersection, a traveling condition of an oncoming vehicle needs to be considered. In an actual scenario, when the autonomous vehicle misjudges a traveling intention of the oncoming vehicle, it is prone to vehicle collision, and serious consequences would be brought to the autonomous vehicle and the oncoming vehicle.

Therefore, a method for controlling a vehicle which is capable of accurately controlling overtaking or yielding to avoid the vehicle collision based on traveling conditions of the autonomous vehicle and the oncoming vehicle is urgently needed.

SUMMARY

The present application provides a method for planning an autonomous vehicle, an apparatus for planning an autonomous vehicle, an electronic device and a storage medium.

According to an aspect of the present application, a method for planning an autonomous vehicle is provided, which may include:
  acquiring first traveling information of an autonomous vehicle, where the first traveling information includes a traveling track and a traveling parameter of the autonomous vehicle;
  acquiring second traveling information of at least one obstacle vehicle, where the second traveling information includes position information and a traveling parameter of the obstacle vehicle;
  predicting a driving intention of the obstacle vehicle according to the acquired second traveling information of the obstacle vehicle;
  planning a vehicle-converging strategy for the autonomous vehicle according to the first traveling information and the driving intention of the obstacle vehicle upon determining that there is a possibility of vehicle-converging between the autonomous vehicle and the obstacle vehicle; and
  controlling the autonomous vehicle to travel according to the vehicle-converging strategy.

According to another aspect of the present application, an apparatus for planning an autonomous vehicle is provided, which may include:
  an autonomous vehicle information acquiring unit, configured to acquire first traveling information of an autonomous vehicle, where the first traveling information includes a traveling track and a traveling parameter of the autonomous vehicle;
  an obstacle vehicle information acquiring unit, configured to acquire second traveling information of at least one obstacle vehicle, where the second traveling information includes position information and a traveling parameter of the obstacle vehicle;
  an obstacle vehicle behavior predicting unit, configured to predict a driving intention of the obstacle vehicle according to the acquired second traveling information of the obstacle vehicle;
  a vehicle-converging strategy planning unit, configured to plan a vehicle-converging strategy for the autonomous vehicle according to the first traveling information and the driving intention of the obstacle vehicle upon determining that there is a possibility of vehicle-converging between the autonomous vehicle and the obstacle vehicle; and
  a controlling unit, configured to control the autonomous vehicle to travel according to the vehicle-collection strategy.

According to another aspect of the present application, an electronic device is provided, which may include:
  at least one processor; and
  a memory in a communicational connection with the at least one processor, where the memory is stored with instructions executable by the at least one processor, the instructions are executed by the at least one processor to cause the at least one processor to execute the method for planning an autonomous vehicle according to the embodiments of the present application.

According to another aspect of the present application, a non-transitory computer readable storage medium having stored computer instructions is provided, the computer instructions may be configured to cause a computer to execute the method for planning an autonomous vehicle according to the embodiments of the present application.

According to the technical solutions of the present application, when the autonomous vehicle and the obstacle vehicle converge, time points of entering a vehicle-converging area can be accurately predicted according to traveling status of both parties, so that a traveling speed of the autonomous vehicle is controlled more accurately, and personal accidents and property loss caused by vehicle collision are avoided.

It should be understood that the statements in this section are not intended to identify key features or essential features of the embodiments of the present application, nor are they intended to limit the scope of the present application. Other features of the present application would become easy to understand from the following description.

BRIEF DESCRIPTION OF DRAWINGS

The drawings are included to provide a better understanding of the technical solutions and should not be construed as limitations of the present application. In the drawings.

DESCRIPTION OF EMBODIMENTS

Exemplary embodiments of the present application are described below in conjunction with the accompanying drawings. The description includes various details of the embodiments of the present application to assist in understanding. The description should be considered as merely exemplary. Accordingly, persons of ordinary skill in the art should recognize that various changes and modifications may be made to the embodiments described herein without departing from the scope and spirit of the present application. Likewise, for clarity and conciseness, description of well-known functions and structures is omitted in the following description.

At present, due to the popularization of vehicles, the traffic flow on urban roads is large, and there are many intersections on urban roads, so it is necessary to plan to yield or overtake frequently while traveling. Research and development of autonomous vehicles has received wide attention, and it is particularly important to accurately plan yielding or overtaking for an autonomous vehicle.

The autonomous vehicle in the embodiments of the present application may be a vehicle controlled by utilizing computer technologies in terms of control traveling. The autonomous vehicle cannot be accelerated or decelerated rapidly in a non-emergency state, so that a driving speed of the vehicle is relatively stable. An obstacle vehicle is a non-automatic vehicle. The obstacle vehicle is driven by a driver, and is greatly influenced by subjective consciousness of the driver.

Assuming that a traveling track, a speed, and an acceleration of an obstacle vehicle predicted from acquired information of the obstacle vehicle are correct, taking into account that a traveling track of an autonomous vehicle is also determined, traveling routes of the two vehicles is equivalent to the determination of a game (vehicle-converging) position between the autonomous vehicle and the obstacle vehicle. Thus a two-dimensional game problem is reduced to a one-dimensional time planning game problem.

Figure 1:
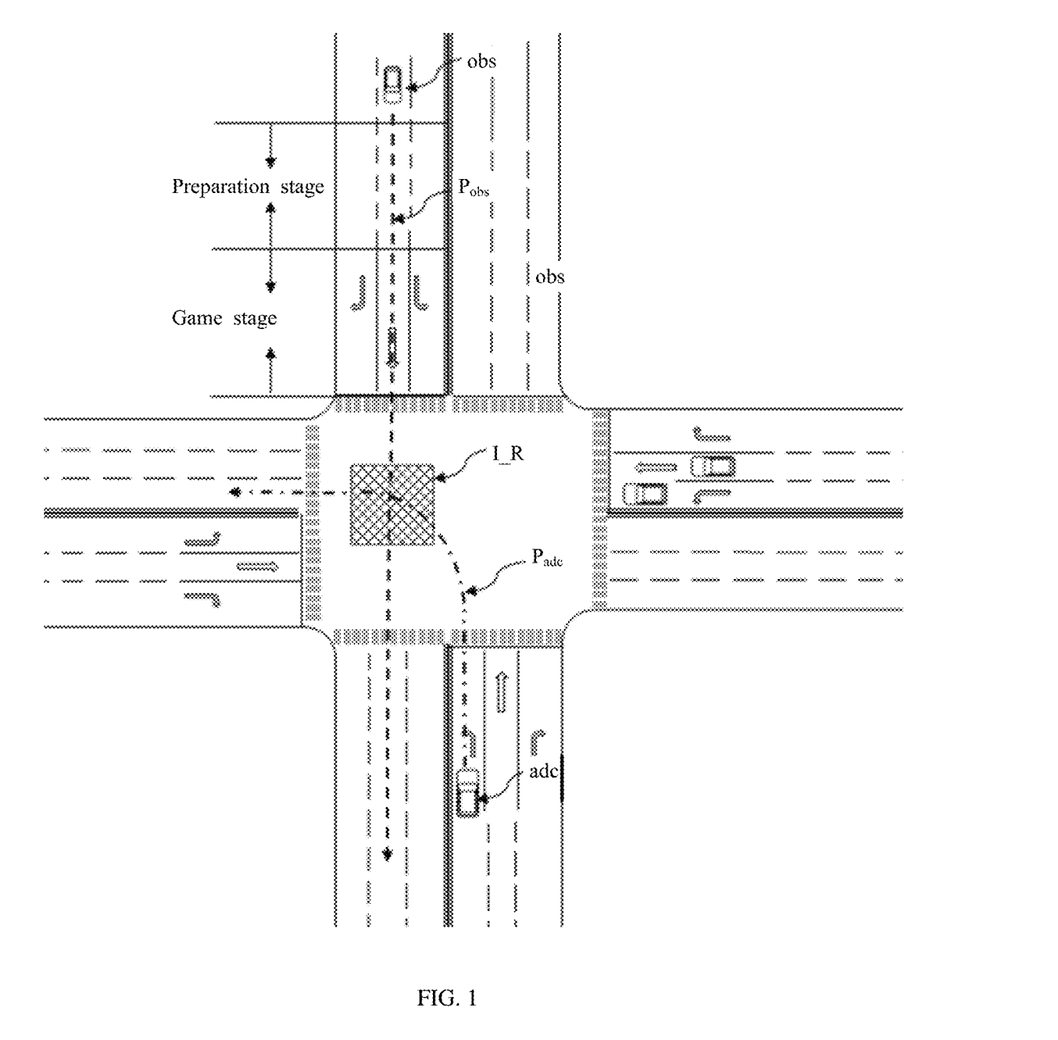
FIG. 1 is a schematic view for illustrating an application scenario of a method for planning an autonomous vehicle according to an embodiment of the present application.

FIG. 1 is a schematic view for illustrating an application scenario of a method for planning an autonomous vehicle according to an embodiment of the present application. FIG. 1 simply shows a scenario in which an autonomous vehicle adc turns left and an obstacle vehicle obs passes straight through an intersection from an opposite lane. But the method for planning an autonomous vehicle and the apparatus for planning an autonomous vehicle in the present application can also be applied to all scenarios where vehicle-converging occurs at the intersection, including a scenario where the autonomous vehicle adc passes straight through the intersection and the obstacle vehicle obs turns left from the opposite lane, a scenario where the autonomous vehicle adc turns right and the obstacle vehicle obs turns left from the opposite lane, and a scenario where the autonomous vehicle adc passes straight through the intersection and the obstacle vehicle obs passes straight through the intersection from left and right roads. The method for planning an autonomous vehicle of the present application may also be suitable for a scenario where the autonomous vehicle overtakes or yields the obstacle vehicle traveling in the same direction. The embodiments of the present application is specifically described by taking the scenario in which the autonomous vehicle adc turns left and the obstacle vehicle obs passes straight through the intersection from the opposite lane as an example, as shown in FIG. 1.

Referring to FIG. 1, assuming that a traveling track taken by the autonomous vehicle adc is a first track $P_{adc}$ that is a track of a left turn at an intersection. A traveling track taken by the obstacle vehicle obs is a second track Pobs of going straight through the intersection from an opposite lane, it may then be determined that time points at which the autonomous vehicle adc enters and leaves a vehicle-converging area (i.e. a game point) I_R, to be $T_{adc,i}$ and $T_{adc,o}$ respectively, and time points at which the obstacle vehicle obs enters and leaves the vehicle-converging area, to be $T_{obs,i}$ and $T_{obs,o}$ respectively. Two vehicles cannot collide at the intersection, thus there may be two cases, namely the obstacle vehicle obs overtaking and passing by or yielding and passing by, which may be expressed in time as follows:

if the obstacle vehicle overtakes and passes by, the obstacle vehicle must leave the game point before the autonomous vehicle enters vehicle-converging area I_R, i.e. $T_{obs,o} < T_{adc,i}$.

if the obstacle vehicle yields and passes by, the obstacle vehicle must enter the game point after the autonomous vehicle leaves the vehicle-converging area I_R, i.e. $T_{obs,o} > T_{adc,i}$.

Figure 2:
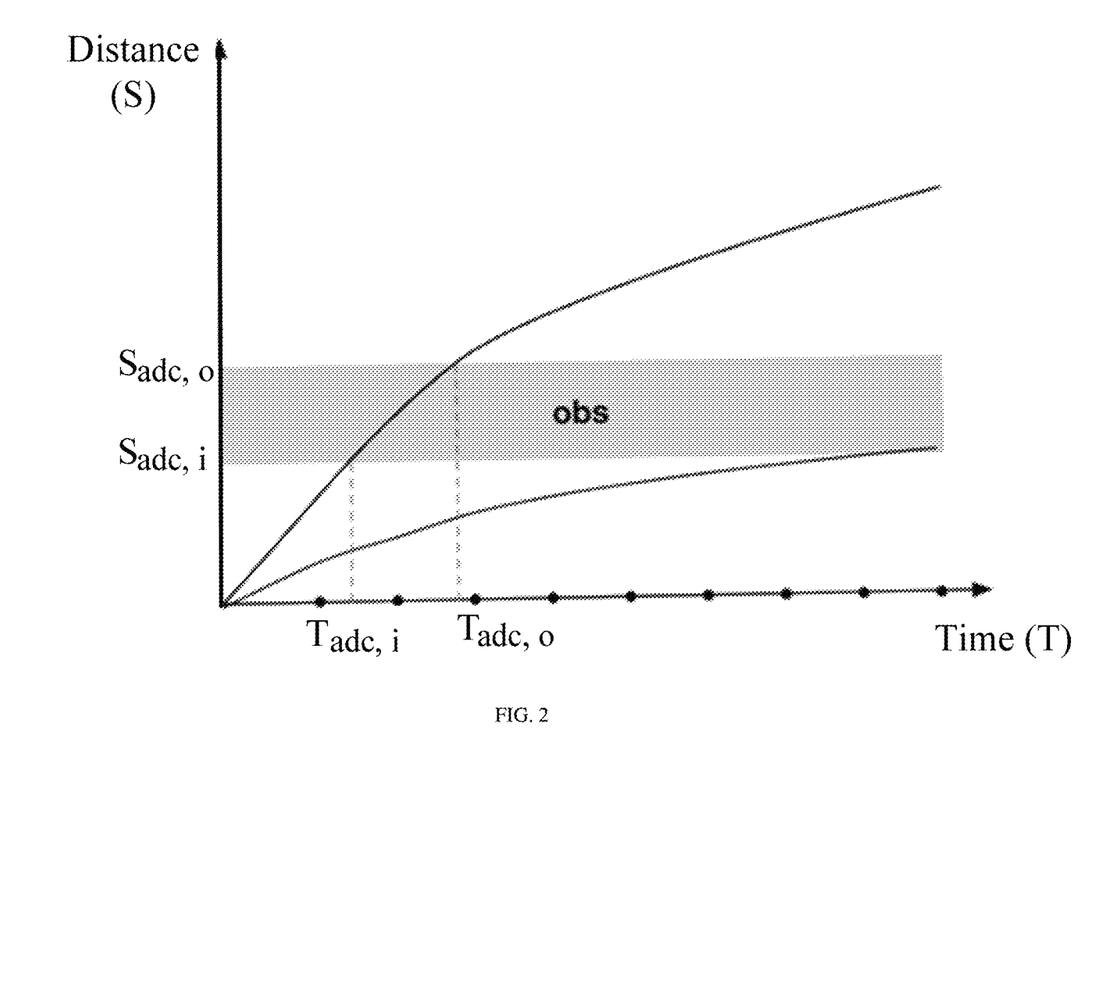
FIG. 2 is a schematic view for illustrating a relationship between time of entering and leaving a vehicle-converging area, and a traveling distance.

Specifically, as shown in FIG. 2, in the case where the obstacle vehicle obs overtakes and passes by, it must leave the vehicle-converging area I_R before the autonomous vehicle adc enters the vehicle-converging area I_R at the time $T_{adc,i}$. If the obstacle vehicle obs yields and passes by, it must enter the vehicle-converging area I_R after the autonomous vehicle adc leaves the vehicle-converging area I_R at the time $T_{adc,o}$. The traveling distance $S_{adc,i}$ of the autonomous vehicle adc going from a current position until entering the vehicle-converging area I_R is constant with the traveling distance $S_{adc,o}$ of the autonomous vehicle adc going from the current position until leaving the vehicle-converging area I_R. However, the time $T_{adc,i}$ for the autonomous vehicle adc to enter the vehicle-converging area I_R, and the time $T_{adc,o}$ for the autonomous vehicle adc to leave the vehicle-converging area I_R are variable based on a traveling speed of the autonomous vehicle adc. Thus a length of time for the autonomous vehicle adc to pass through the vehicle-converging area I_R is also variable. This is also true for the obstacle vehicle obs.

Figure 3:
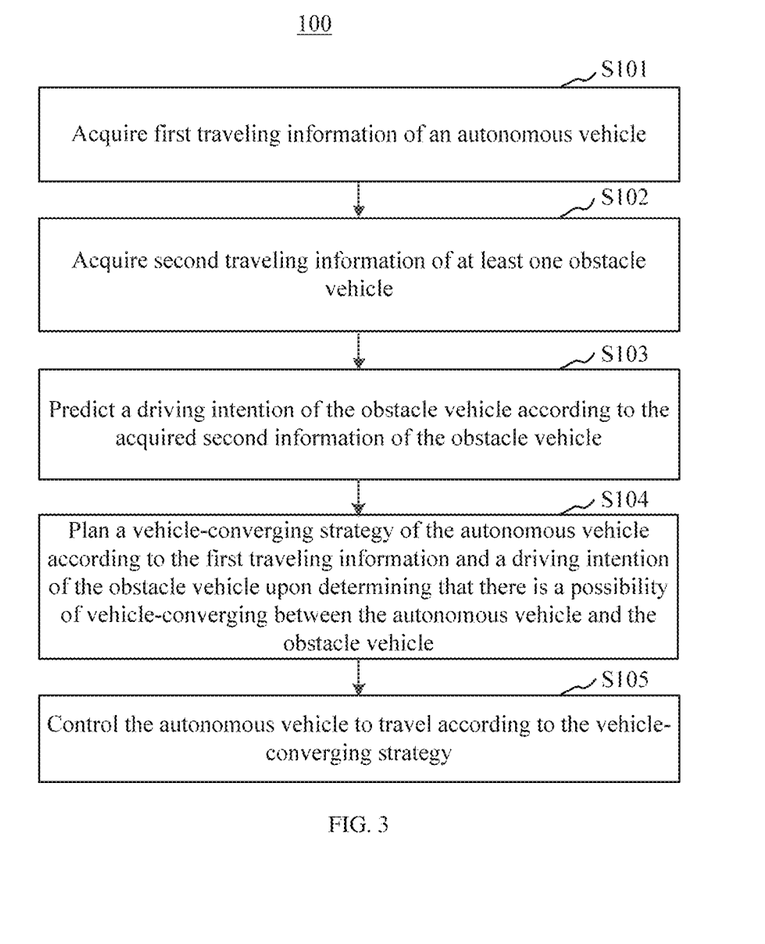
FIG. 3 is a flowchart of a method for planning an autonomous vehicle according to an embodiment of the present application.

FIG. 3 is a flow chart of a method for planning an autonomous vehicle according to an embodiment of the present application. As shown in FIG. 3, the method 100 for planning an autonomous vehicle may include the following steps.

Step 101: acquire first traveling information of an autonomous vehicle adc, where the first traveling information includes a traveling track and a traveling parameter of the autonomous vehicle adc.

Before the autonomous vehicle adc starts to travel, a destination needs to be input into a navigation apparatus installed in the vehicle. The navigation apparatus plans a traveling route according to a current position and a destination position of the vehicle. The autonomous vehicle adc travels according to the traveling route, a speed limit rule of a corresponding lane and vehicle conditions on a road. The autonomous vehicle adc is generally mounted with an internal sensor for acquiring vehicle traveling information such as a speed and an acceleration of the vehicle, and also with an external sensor such as a radar and a camera for sensing a surrounding environment. A controlling unit of the autonomous vehicle adc acquires the traveling track and road information from the navigation apparatus, and acquires traveling information of the vehicle from the internal sensor, and acquires traveling information of surrounding vehicles from the external sensor. The traveling parameter may include at least one of the speed and the acceleration.

Step 102: acquire second traveling information of at least one obstacle vehicle obs, where the second traveling information includes position information and a traveling parameter of the obstacle vehicle obs.

Specifically, the second traveling information of the obstacle vehicle obs may include position information of the obstacle vehicle obs at more than two time points and a lane position where the obstacle vehicle obs is located. The traveling parameter may include at least one of the speed and the acceleration.

Step 103: predict a driving intention of the obstacle vehicle obs according to the acquired second traveling information of the obstacle vehicle obs.

The autonomous vehicle adc can acquire a plurality of images of the obstacle vehicle obs through the external sensor, such as the camera, and determine a lane position of the obstacle vehicle obs in a road or turn-on information of a turn signal of the obstacle vehicle obs from the images. The position of the lane where the vehicle is located or the turn-on state of the turn signal may be used to predict a traveling track of the obstacle vehicle obs. The autonomous vehicle may also calculate the speed and/or acceleration of the obstacle vehicle obs from the acquired position information of the obstacle vehicle obs at a plurality of time points. That is, the traveling information of the obstacle vehicle obs may include information of the lane position (a left-turn lane, a through lane, or a right-turn lane), information of the turn signal, information of the speed and/or the acceleration. The driving intention of the obstacle vehicle obs is predicted according to the traveling track and the information of the acceleration of the obstacle vehicle obs.

Step 104: plan a vehicle-converging strategy for the autonomous vehicle adc according to the first traveling information and the driving intention of the obstacle vehicle obs upon determining that there is a possibility of vehicle-converging between the autonomous vehicle adc and the obstacle vehicle obs.

Step 105: control the autonomous vehicle adc to travel according to the vehicle-converging strategy.

According to the method 100 for planning an autonomous vehicle in the embodiment of the present application, an accurate vehicle-converging strategy is provided for the autonomous vehicle adc by predicting the driving intention of the obstacle vehicle obs. Thus traffic accidents caused by wrong decisions of the autonomous vehicle adc can be reduced, and the probability of taking over by a driver is reduced.

Optionally, in the method 100 for planning an autonomous vehicle according to the embodiment of the present application, the step 103 of predicting the driving intention of the obstacle vehicle obs according to the acquired second traveling information of the obstacle vehicle obs may include:

computing, according to the acquired first traveling information of the autonomous vehicle adc, time when the autonomous vehicle adc enters a vehicle-converging area and time when the autonomous vehicle adc leaves the vehicle-converging area;

calculating an overtaking acceleration constraint and a yielding acceleration constraint of the obstacle vehicle obs according to the time $T_{adc,i}$ when the autonomous vehicle adc enters a vehicle-converging area I_R and/or the time $T_{adc,o}$ when the autonomous vehicle adc leaves the vehicle-converging area I_R, and the second traveling information of the obstacle vehicle obs; and predicting the driving intention of the obstacle vehicle obs based on the overtaking acceleration constraint and the yielding acceleration constraint of the obstacle vehicle obs.

Assuming that a speed of the obstacle vehicle obs when detected is $V_{obs}$, an acceleration is $A_{obs}$, the distance to an entry location of the vehicle-converging area I_R is $D_i$ and the distance to an exit location of the vehicle-converging area I_R is $D_o$, the following relationships are given.

When the obstacle vehicle obs plans to overtake, $f(D_o, V_{obs}, A_{obs}) < T_{adc,i}$.

When the obstacle vehicle obs plans to yield, $f(D_i, V_{obs}, A_{obs}) > T_{adc,o}$.

Considering that a problem of the obstacle vehicle obs entering a certain position is solved by a quadratic equation using the speed and acceleration (V, A) of the obstacle vehicle obs, a new constraint may be introduced, that is, a distance constraint, is used as follows.

When the obstacle vehicle obs is to overtake and pass by, it should have left the vehicle-converging area I_R when the autonomous vehicle adc enters the vehicle-converging area I_R at the time $T_{adc,i}$:

$$V_{obs}T_{adc,i} + 1/2 A_{obs} T^2_{adc,i} > D_o \qquad (1)$$

When the obstacle vehicle obs is to yield and pass by, it should have not entered the vehicle-converging area I_R yet when the autonomous vehicle adc leaves the vehicle-converging area I_R at the time $T_{adc,o}$:

$$V_{obs}T_{adc,o} + 1/2 A_{obs} T^2_{adc,o} < D_i \qquad (2)$$

According to the above mathematical formulas (1) and (2), acceleration constraints of the obstacle vehicle under two conditions can be solved, namely, $A_{obs} > A_{overtake,threshold}$ when overtaking, and $A_{obs} < A_{yield,threshold}$ when yielding.

Optionally, the predicting the driving intention of the obstacle vehicle obs based on the overtaking acceleration constraint and the yielding acceleration constraint of the obstacle vehicle obs may include: acquiring an acceleration of the obstacle vehicle obs, and determining the driving intention by comparing the acceleration with an acceleration constraint for the driving intention of overtaking and an acceleration constraint for the driving intention of yielding.

Regarding the planned vehicle-converging strategy, the autonomous vehicle adc also guarantees the comfort of the obstacle vehicle obs during traveling, namely the obstacle vehicle obs cannot accelerate or decelerate too fast and its acceleration is within a reasonable preset acceleration range $[A_{dec,comfort}, A_{acc,comfort}]$. If the calculated value cannot guarantee this, a traveling track taken by the autonomous vehicle adc is considered to be an unreasonable track and should be pruned.

In other words, determining that the driving intention is yielding, when it is calculated according to the second traveling information of the obstacle vehicle obs that the obstacle vehicle obs is accelerating and the overtaking acceleration constraint exceeds a preset acceleration range;

and determine that the driving intention is overtaking, when it is calculated according to the second traveling information of the obstacle vehicle obs that the obstacle vehicle obs is decelerating and the yielding acceleration constraint exceeds a preset acceleration range.

Optionally, the predicting the driving intention of the obstacle vehicle obs according to the acquired second traveling information of the obstacle vehicle obs may also include:

estimating acceleration distribution of the obstacle vehicle obs according to acquired position information of the obstacle vehicle obs at each moment; and the predicting the driving intention of the obstacle vehicle obs based on the overtaking acceleration constraint and the yielding acceleration constraint of the obstacle vehicle obs may include:

predicting the driving intention of the obstacle vehicle obs by comparing the acceleration distribution with the overtaking acceleration constraint and the yielding acceleration constraint of the obstacle vehicle obs.

Suppose that the measured historical track of the obstacle vehicle obs is (Position St, Speed Vt), (St−1, Vt−1) . . . , and the acceleration at which the obstacle vehicle obs overtakes or yields is not observable. For this purpose, a kalman filtering method may be used for deriving the acceleration. Assuming that the acceleration of the obstacle vehicle obs at an initial time $A_o \sim N(0, \sigma^2_0)$, the acceleration of the obstacle vehicle obs at a current moment $A_t \sim N(\mu_t, \sigma^2_t)$ may be acquired based on the historical track. An acceleration distribution value $[\mu_t-2\sigma_t, \mu_t+2\sigma t]$ of the obstacle vehicle obs is determined by the gaussian distribution $2\sigma$ rule (a principle of impossible events). Based on the acceleration distribution value of the obstacle vehicle obs, it is determined a possibility describing whether the obstacle vehicle is yielding or overtaking.

In the above embodiments, more accurate prediction of the driving intention is achieved by introducing history information confirmation mechanism.

Further, inventors of the present application have found that, in practical situations, since the obstacle vehicle obs is driven by a driver, actual decision time when the obstacle vehicle obs overtakes or yields may be earlier or later than time at which the prediction is performed by the autonomous vehicle. For example, before the autonomous vehicle adc makes a decision, the obstacle vehicle obs may have completed to make a decision, such as starting to speed up to overtake or slow down to yield, or travel with a constant speed so as to overtake or yield. Alternatively, the driver of the obstacle vehicle obs may start to speed up to overtake or slow down to yield at a certain time after the decision is made by the autonomous vehicle adc. In other words, at an early stage of the game, the obstacle vehicle obs does not consider the game as a game process and pursues self-benefit maximization. So the yielding and overtaking decision made by the obstacle vehicle obs does not appear at the early stage. The noise in the detected speed and acceleration signal of the obstacle vehicle obs at the early stage is relatively large, which would possibly reduce the accuracy of planning the autonomous vehicle.

Therefore, the solution to the fundamental problem is to determine when to start to determine the driving intention of the obstacle vehicle obs. Firstly, it needs to be a key moment of the game, namely, the time point when the obstacle vehicle obs must take an action to avoid a collision. Secondly, it needs to be at the moment when the sensing is stable, i.e., when a position and a speed of the obstacle vehicle obs can be accurately detected. The moment herein needs to be kept as short as possible.

In an embodiment, the predicting the driving intention of the obstacle vehicle obs according to the acquired second traveling information of the obstacle vehicle obs may include:

dividing, according to the acquired second traveling information of the obstacle vehicle and an extreme value of a preset acceleration range, traveling of the obstacle vehicle obs before entering the vehicle-converging area into a preparation stage and a game stage; and predicting the driving intention of the obstacle vehicle obs according to the traveling parameter of the obstacle vehicle obs after entering the game stage.

Applying the manner herein to the aforementioned model:

when the obstacle vehicle obs yields, the obstacle vehicle obs needs to decelerate. Assuming that the maximum acceleration of the obstacle vehicle obs is $A_{obs,max}$, the time for generating an action is:

$$V_{obs}T_{adc,o}+1/2A_{obs,max}(T_{adc,o}-\tau)^2 \leq D_i \quad (3)$$

When the obstacle vehicle obs overtakes, the obstacle vehicle obs needs to be accelerated. Assuming that the minimum acceleration of the obstacle vehicle obs is $A_{obs,min}$, the time for generating an action acquired is:

$$V_{obs}T_{adc,i}+1/2A_{obs,min}(T_{adc,i}-\tau)^2 D_o \quad (4)$$

Optionally, the predicting the driving intention of the obstacle vehicle obs according to the traveling parameter of the obstacle vehicle obs after entering the game stage may include:

comparing the overtaking acceleration constraint and the yielding acceleration constraint with the acceleration distribution of the obstacle vehicle obs and predicting the driving intention of the obstacle vehicle obs to be overtaking or yielding.

Based on the predicted driving intention of the obstacle vehicle obs in any of the above-described embodiments, the planing the vehicle-converging strategy for the autonomous vehicle adc according to the first traveling information and the driving intention of the obstacle vehicle obs may include:

planning the autonomous vehicle adc to yield when the predicted driving intention of the obstacle vehicle obs is overtaking; and planning the autonomous vehicle adc to overtake when the predicted driving intention of the obstacle vehicle obs is yielding.

Optionally, the planning the vehicle-converging strategy for the autonomous vehicle adc according to the first traveling information of the autonomous vehicle adc and the driving intention of the obstacle vehicle obs may include:

updating, according to the driving intention of the obstacle vehicle, time when the obstacle vehicle obs enters the vehicle-converging area and/or time when the obstacle vehicle leaves the vehicle-converging area; and planning the autonomous vehicle adc to yield under a condition that the computed time $T_{adc,i}$ when the autonomous vehicle adc enters the vehicle-converging area I_R is later than the time $T_{obs,i}$ when the obstacle vehicle obs enters the vehicle-converging area I_R; otherwise, planning the autonomous vehicle adc to overtake.

In other words, the vehicles that arrive in the vehicle-converging area I_R first pass first. Thus in a case of possible vehicle-converging, the speed of the vehicles participating in the game is changed as little as possible when the vehicles pass through the vehicle-converging area.

Optionally, in the method 100 for planning an autonomous vehicle according to the embodiment of the present application, the planning the vehicle-converging strategy for the autonomous vehicle adc according to the first traveling information and the driving intention of the obstacle vehicle obs may include:

computing, according to the acquired traveling parameter of the autonomous vehicle adc, a speed of the autonomous vehicle adc when entering the vehicle-converging area I_R;

predicting, according to the acquired information of the obstacle vehicle obs, a speed of the obstacle vehicle obs when entering the vehicle-converging area I_R and updating time when the obstacle vehicle obs enters the vehicle-converging area and/or time when the obstacle vehicle obs leaves the vehicle-converging area; and planning the autonomous vehicle adc to overtake or yield according to the computed speed of the autonomous vehicle adc when entering the vehicle-converging area I_R and the predicted speed of the obstacle vehicle obs when entering the vehicle-converging area I_R, under a condition that a difference between the time $T_{adc,i}$ when the autonomous vehicle adc enters the vehicle-converging area I_R and the predicted time $T_{obs,i}$ when the obstacle vehicle obs enters the vehicle-converging area I_R is smaller than a preset value.

In a case where a time difference of the two vehicles entering the vehicle-converging area I_R is relatively small, the traveling speed can determine the time when the two vehicles leave the vehicle-converging I_R. Therefore, in this case, the vehicle with a higher speed can overtake and pass by.

Specifically, under the condition that the time difference between the computed time $T_{adc,i}$ when the autonomous vehicle adc enters the vehicle-converging area I_R and the predicted time $T_{obs,i}$ when the obstacle vehicle obs enters the vehicle-converging area I_R is smaller than a preset value, planning the autonomous vehicle adc to overtake and pass by in a case where the computed speed of the autonomous vehicle adc when entering the vehicle-converging area I_R is higher than the predicted speed of the obstacle vehicle obs when entering the vehicle-converging area I_R, and planning the autonomous vehicle adc to yield and pass by in a case where the computed speed of the autonomous vehicle adc when entering the vehicle-converging area I_R is lower than the predicted speed of the obstacle vehicle obs when entering the vehicle-converging area I_R.

Yielding and overtaking are relative to the autonomous vehicle adc and the obstacle vehicles obs. That is, when the obstacle vehicle obs overtakes, the autonomous vehicle adc necessarily needs to yield. Under a condition that the obstacle vehicle obs yields, the autonomous vehicle adc can overtake and pass by. Therefore, the following describes a method for planning an autonomous vehicle of the present application by predicting and analyzing the yielding and overtaking intention of the obstacle vehicle obs.

In order to ensure the safety of vehicles, particularly when the predicted time when the autonomous vehicle adc enters the vehicle-converging area I_R is very close to the predicted time when the obstacle vehicle obs enters the vehicle-converging area I_R, it is necessary to predict the traveling behavior of the obstacle vehicle obs more accurately.

When the autonomous vehicle adc yields, a track which does not require the obstacle vehicle obs to accelerate is selected. When the autonomous vehicle adc overtakes, a track which does not require the obstacle vehicle obs to decelerate is selected.

By determining whether the obstacle vehicle obs yields or overtakes, it can be reversely deduced that the autonomous vehicle adc needs to overtake or yield when traveling follow the track. If the autonomous vehicle adc needs to yield, a deceleration action is taken, and if the autonomous vehicle adc needs to overtake, an acceleration action is taken.

Herein, in order to meet the requirement of perception stability, the preparation stage is required to be an area where the autonomous vehicle adc can stably detect the moving speed of the obstacle vehicle obs. And in order to accurately reflect the driving intention of the obstacle vehicle obs in the game stage, the preparation stage needs to be as close to the vehicle-converging area as possible. In addition, the position of the preparation stage needs to meet the distance required by straight-ahead yielding or overtaking.

Specifically, the preparation stage may be determined based on the speed of the obstacle vehicle obs and the distance to the vehicle-converging area. That is, the higher the current speed of the obstacle vehicle obs is, the longer the deceleration distance is required when the obstacle vehicle obs takes a deceleration action. Therefore, earlier determination of the intention of the obstacle vehicle obs is required.

A gaming strategy of the method 100 for planning an autonomous vehicle according to the embodiment of the present application is described in detail below with reference to FIG. 4.

Figure 4:
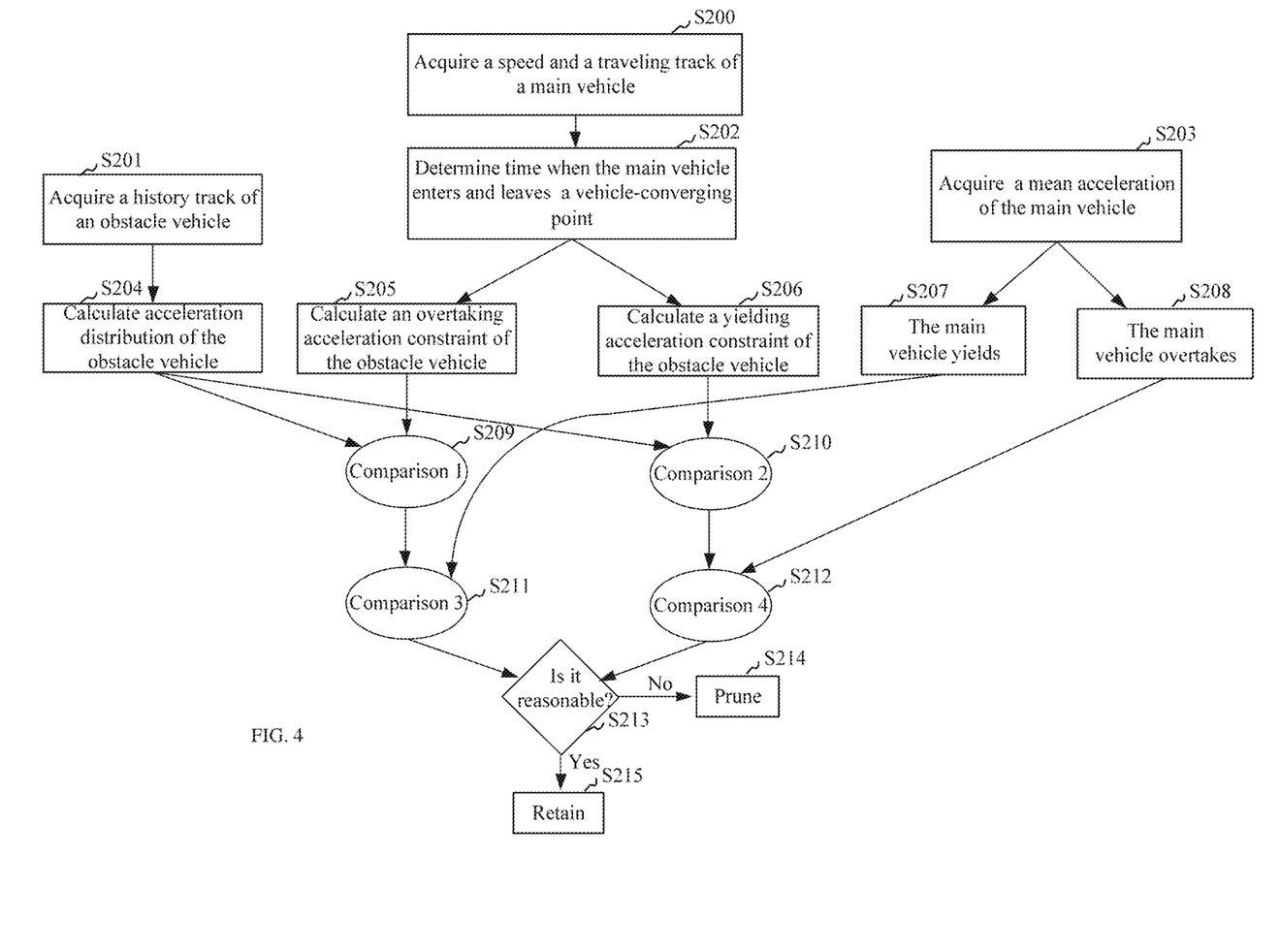
FIG. 4 is a block diagram for explaining a yielding and overtaking game according to an embodiment of the present application.

Referring to FIG. 4, in step 200, the autonomous vehicle adc acquires its current speed and traveling track. In step 202, time $T_{adc,i}$ when the autonomous vehicle adc enters the vehicle-converging area I_R and time $T_{adc,o}$ when the autonomous vehicle adc leaves the vehicle-converging area I_R are computed according to the current speed and the traveling track. In step 201, a history track of the obstacle vehicle obs is acquired. In step 204, the speed and acceleration distribution value of the obstacle vehicle obs are computed according to the history track of the obstacle vehicle obs. Specifically, a mean value and a standard deviation value of the acceleration of the obstacle vehicle obs are calculated using the acquired history track, thus the acceleration distribution value of the obstacle vehicle obs is calculated. In step 205, the overtaking acceleration constraint of the obstacle vehicle obs is calculated using the mathematical formula (4). Herein, in order to avoid a vehicle-converging collision, the time during which the obstacle vehicle obs can accelerate is shortened by a predetermined time τ. In step 209, the calculated overtaking acceleration constraint for the obstacle vehicle obs is compared with the acceleration distribution value of the obstacle vehicle obs. If the overtaking acceleration constraint for the obstacle vehicle obs is within the acceleration distribution value, it is indicated that the overtaking acceleration constraint for the obstacle vehicle obs is available. In step 211, an overtaking track of the obstacle vehicle obs is compared with a yielding track of the autonomous vehicle adc. In step 213, whether the vehicle-converging strategy is reasonable is determined according to a comparison result. If it is reasonable, in step 215, the strategy is retained, otherwise, in step 214, pruning is performed.

In step 206, the yielding acceleration constraint of the obstacle vehicle obs is calculated using the mathematical formula (3). Herein, in order to avoid a vehicle-converging collision, the time during which the obstacle vehicle obs can decelerate is shortened by a predetermined time τ. In step 210, the calculated yielding acceleration constraint for the obstacle vehicle obs is compared with the acceleration distribution value of the obstacle vehicle obs. If the yielding acceleration constraint for the obstacle vehicle obs is within the acceleration distribution value, it is indicated that the yielding acceleration constraint for the obstacle vehicle obs is usable. In step 212, a yielding track of the obstacle vehicle obs is compared with an overtaking track of the autonomous vehicle adc. In step 213, whether the vehicle-converging strategy is reasonable is determined according to the comparison result. If it is reasonable, in step 215, the strategy is retained, otherwise, in step 214, pruning is performed.

Specifically, if a predicted result is that the obstacle vehicle obs accelerates to overtake and pass by, and the minimum acceleration is within the acceleration distribution value, the autonomous vehicle adc would yield and pass by. If the prediction result is that the obstacle vehicle obs accelerates to overtake and pass by, and the minimum acceleration is not within the acceleration distribution value, the autonomous vehicle adc would decelerate to yield and pass by. If the prediction result is that the obstacle vehicle obs decelerates to yield and pass by, and the maximum acceleration is within the acceleration distribution value, the autonomous vehicle adc would overtake and pass by. If the prediction result is that the obstacle vehicle obs decelerates to yield and pass by, and the maximum acceleration is not within the acceleration distribution value, the autonomous vehicle adc would accelerate to overtake and pass by. If the speed required by the autonomous vehicle adc when accelerating to overtake and pass by exceeds speed limit of a corresponding road, an overtaking behavior is given up. If the acceleration required by the autonomous vehicle adc when yielding and passing by is smaller than a preset value, a yielding behavior is given up.

In the method for planning an autonomous vehicle according to the embodiments of the present application, the length and/or the position of the preparation stage may be determined according to the speed of the obstacle vehicle obs.

Optionally, under a condition that the speed required by the autonomous vehicle adc when accelerating to overtake and pass by exceeds the speed limit of the corresponding road, giving up an overtaking behavior; and under a condition that the acceleration required by the autonomous vehicle adc when yielding and passing by is smaller than a preset value, giving up a yielding and passing by behavior.

In the above-described embodiments, a calculation process of acceleration when yielding or overtaking is analyzed from the perspective of the obstacle vehicle obs. For the autonomous vehicle adc, the requirement with respect to the acceleration distribution value should also be met when yielding or overtaking, so that whether a strategy of yielding or overtaking by the autonomous vehicle adc is reasonable or not can be determined. Therefore, a process of determining yielding and overtaking by the autonomous vehicle adc is not described in detail herein.

In the method 100 for planning an autonomous vehicle according to the embodiments of the present application, the driving intention of the obstacle vehicle obs is predicted as early as possible and the rationality of yielding and overtaking is analyzed. When traveling tracks of two vehicles converge, a yielding or overtaking decision can be made more accurately. Thus the traveling speed of the autonomous vehicle is controlled more accurately, and personal accidents and property loss caused by vehicle collision are avoided.

Figure 5:
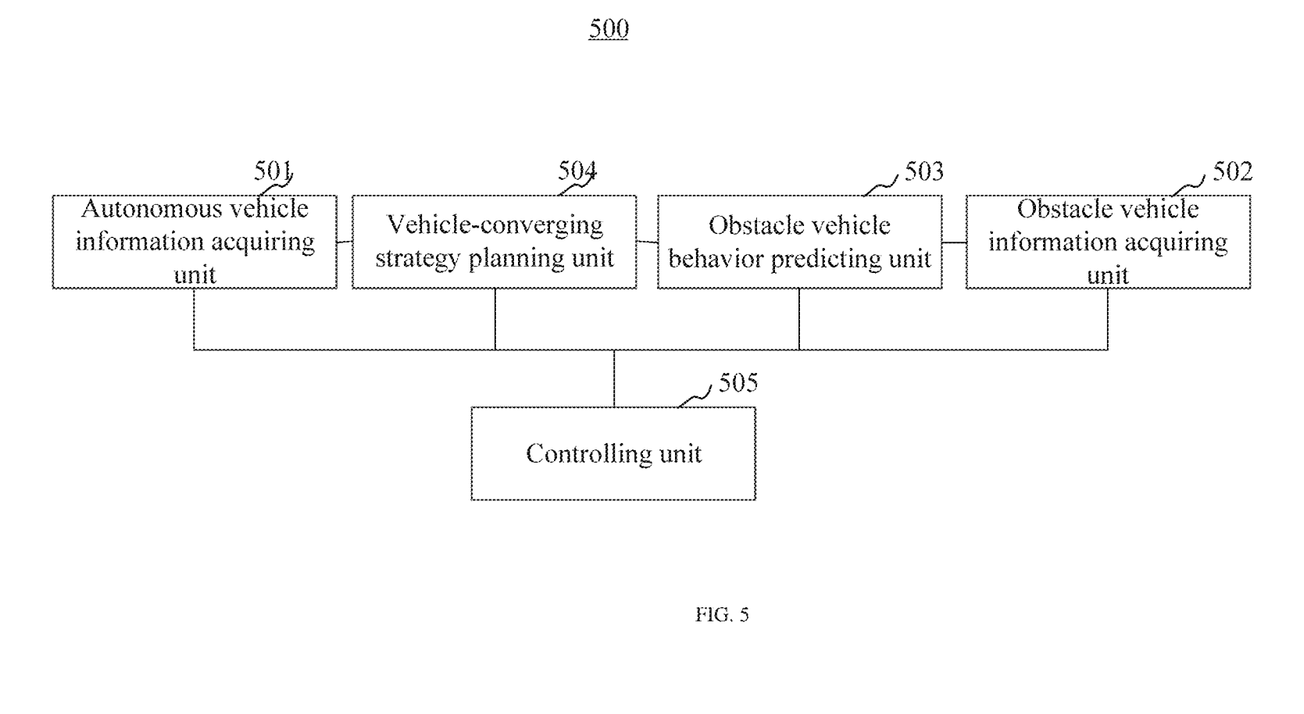
FIG. 5 is a block diagram of an apparatus for planning an autonomous vehicle according to an embodiment of the present application.

FIG. 5 is a block diagram of an apparatus 500 for planning an autonomous vehicle according to an embodiment of the present application. The apparatus 500 for planning the autonomous vehicle in the present embodiment is applicable in traveling of an autonomous vehicle or an unmanned vehicle, and controls a yielding or overtaking behavior of the autonomous vehicle adc when there is a possibility of vehicle-converging between the autonomous vehicle adc and an obstacle vehicle obs. The apparatus 500 for planning an autonomous vehicle may include: an autonomous vehicle information acquiring unit 501, configured to acquire first traveling information of the autonomous vehicle adc, where the first traveling information includes a traveling track and a traveling parameter of the autonomous vehicle adc; an obstacle vehicle information acquiring unit 502, configured to acquire second traveling information of at least one obstacle vehicle obs, where the second traveling information includes position information and a traveling parameter of the obstacle vehicle obs; an obstacle vehicle behavior predicting unit 503, configured to predict a driving intention of the obstacle vehicle obs according to the acquired second traveling information of the obstacle vehicle obs; a vehicle-converging strategy planning unit 504, configured to plan a vehicle-converging strategy for the autonomous vehicle adc according to the first traveling information and the driving intention of the obstacle vehicle upon determining that there is a possibility of vehicle-converging between the autonomous vehicle adc and the obstacle vehicle obs; and a controlling unit 505, configured to control the autonomous vehicle adc to travel according to the vehicle-collection strategy.

Optionally, the obstacle vehicle behavior predicting unit 503 is further configured to:

compute, according to the acquired first traveling information of the autonomous vehicle adc, time $T_{adc,i}$ when the autonomous vehicle adc enters a vehicle-converging area I_R and time $T_{adc,o}$ when the autonomous vehicle adc leaves the vehicle-converging area I_R;

calculate an overtaking acceleration constraint and a yielding acceleration constraint of the obstacle vehicle obs according to the time $T_{adc,i}$ when the autonomous vehicle adc enters the vehicle-converging area I_R, the time $T_{adc,o}$ when the autonomous vehicle adc leaves the vehicle-converging area I_R and the second traveling information of the obstacle vehicle obs; and predict the driving intention of the obstacle vehicle obs based on the overtaking acceleration constraint and the yielding acceleration constraint of the obstacle vehicle obs.

Optionally, the obstacle vehicle behavior predicting unit 503 is further configured to:

acquire an acceleration of the obstacle vehicle obs, and determine the driving intention by comparing the acceleration with an acceleration constraint for the driving intention of overtaking and an acceleration constraint for the driving intention of yielding.

Optionally, the obstacle vehicle behavior predicting unit 503 is further configured to:

determine that the driving intention is yielding, when it is calculated according to the second traveling information of the obstacle vehicle obs that the obstacle vehicle obs is accelerating and the overtaking acceleration constraint exceeds a preset acceleration range; and determine that the driving intention is overtaking, when it is calculated according to the second traveling information of the obstacle vehicle obs that the obstacle vehicle obs is decelerating and the yielding acceleration constraint exceeds a preset acceleration range.

Optionally, the obstacle vehicle behavior predicting unit 503 is further configured to:

estimate acceleration distribution of the obstacle vehicle obs according to acquired position information of the obstacle vehicle obs at each moment; and predict the driving intention of the obstacle vehicle obs by comparing the acceleration distribution with the overtaking acceleration constraint and the yielding acceleration constraint of the obstacle vehicle obs.

Optionally, the vehicle-converging strategy planning unit 504 is further configured to:

plan the autonomous vehicle adc to yield when the predicted driving intention of the obstacle vehicle obs is overtaking; and plan the autonomous vehicle adc to overtake when the predicted driving intention of the obstacle vehicle obs is yielding.

Optionally, the vehicle-converging strategy planning unit 504 is further configured to:

update, according to the driving intention of the obstacle vehicle obs, time $T_{obs,i}$ when the obstacle vehicle obs enters the vehicle-converging area I_R, and/or time $T_{obs,o}$ when the obstacle vehicle leaves the vehicle-converging area I_R; and plan the autonomous vehicle adc to yield under a condition that the computed time $T_{adc,i}$ when the autonomous vehicle adc enters the vehicle-converging area I_R is later than time $T_{obs,i}$ when the obstacle vehicle obs enters the vehicle-converging area I_R; otherwise, plan the autonomous vehicle adc to overtake.

Optionally, the vehicle-converging strategy planning unit 504 is further configured to:

compute, according to the acquired traveling parameter of the autonomous vehicle adc, a speed of the autonomous vehicle adc when entering the vehicle-converging area I_R;

predict, according to the driving intention of the obstacle vehicle, a speed of the obstacle vehicle obs when entering the vehicle-converging area and update time $T_{obs,i}$ when the obstacle vehicle obs enters the vehicle-converging area I_R and/or time $T_{obs,o}$ when the obstacle vehicle leaves the vehicle-converging area I_R; and plan the autonomous vehicle adc to overtake or yield according to the computed speed of the autonomous vehicle adc when entering the vehicle-converging area I_R and the predicted speed of the obstacle vehicle obs when entering the vehicle-converging area I_R under a condition that a difference between the computed time $T_{adc,i}$ when the autonomous vehicle adc enters the vehicle-converging area I_R and the predicted time $T_{obs,i}$ when the obstacle vehicle obs enters the vehicle-converging area I_R is smaller than a preset value.

Optionally, the vehicle-converging strategy planning unit 504 is further configured to:

plan the autonomous vehicle adc to overtake and pass by under a condition that the computed speed of the autonomous vehicle adc when entering the vehicle-converging area I_R is higher than the predicted speed of the obstacle vehicle obs when entering the vehicle-converging area I_R; and plan the autonomous vehicle adc to yield and pass by under a condition that the computed speed of the autonomous vehicle adc when entering the vehicle-converging area is lower than the predicted speed of the obstacle vehicle obs when entering the vehicle-converging area.

Optionally, the vehicle-converging strategy planning unit 504 is further configured to:

comparing the overtaking acceleration constraint and the yielding acceleration constraint with an acceleration distribution of the obstacle vehicle obs and predict the driving intention of the obstacle vehicle obs to be overtaking or yielding.

Optionally, the obstacle vehicle behavior predicting unit 503 is further configured to:

divide, according to the acquired second traveling information of the obstacle vehicle obs and an extreme value of a preset acceleration range, traveling of the obstacle vehicle obs before entering the vehicle-converging area I_R into a preparation stage and a game stage; and predict the driving intention of the obstacle vehicle obs according to the traveling parameter of the obstacle vehicle obs after entering the game stage.

Optionally, the vehicle-converging strategy planning unit 504 is further configured to:

give up an overtaking and passing by behavior under a condition that a speed required by the autonomous vehicle adc when accelerating to overtake and pass by exceeds a speed limit of a corresponding road; and give up a yielding and passing by behavior under a condition that an acceleration required by the autonomous vehicle adc when yielding and passing by is smaller than a preset value.

A method for planning an autonomous vehicle and an apparatus for planning an autonomous vehicle provided by the embodiments of the present application are applied to the field of autonomous driving in computer technologies, so as to accurately determine the driving intention of the obstacle vehicle obs when there is a possibility of vehicle-converging between the autonomous vehicle adc and the obstacle vehicle obs, thus achieving more stable control on the traveling of the autonomous vehicle adc, and avoiding vehicle collision.

In the method for planning an autonomous vehicle and the apparatus for planning an autonomous vehicle according to the embodiments of the present application, a vehicle-converging strategy for the autonomous vehicle adc is rationally planned, so as to ensure the safety of two parties as well as the comfort of interactive vehicle and self-comfort, thus achieving a win-win cooperation.

According to the embodiments of the present application, the present application also provides an electronic device and a readable storage medium.

The electronic device may include: one or more processors, a memory, and interfaces for connecting the components, including a high speed interface and a low speed interface. The various components are interconnected using different buses and may be mounted on a common motherboard or in other manners as desired. The processor may process instructions for execution within the electronic device, including instructions stored in the memory or on the memory for displaying graphical information of a graphical user interface (GUI) on an external input/output apparatus (such as a display device coupled to the interface). In other embodiments, multiple processors and/or multiple buses may be used, along with multiple memories, if desired. Also, multiple electronic devices may be connected, with each electronic device providing some of the necessary operations (e.g. as a server array, a group of blade servers, or a multi-processor system).

The memory is a non-transitory computer readable storage medium as provided herein. The memory stores instructions executable by at least one processor to cause the at least one processor to execute a method for planning an autonomous vehicle provided by the present application. The non-transitory computer-readable storage medium of the present application stores computer instructions for causing a computer to execute the method for planning an autonomous vehicle provided by the present application.

The memory, as a non-transitory computer-readable storage medium, may be used to store non-transitory software programs, non-transitory computer-executable programs, and modules, such as program instructions or modules corresponding to the method for planning an autonomous vehicle in embodiments of the present application. The processor executes various functional applications of the server and data processing by running non-transitory software programs, instructions, and modules stored in the memory, i.e. implementing the method for planning an autonomous vehicle in the above method embodiments.

The memory may include a program storage area and a data storage area. The storage program area may store an operating system, an application program required for at least one function. The data storage area may store data created by use of the electronic apparatus according to the embodiments of the present application, and the like. Further, the memory may include a high speed random access memory, and may also include a non-transitory memory, such as at least one magnetic disk storage device, a flash memory device, or other non-transitory solid state storage devices. In some embodiments, the memory optionally includes a memory located remotely from the processor, which may be connected to the electronic device of embodiments of the present application via a network. Examples of such networks include, but are not limited to, the internet, intranets, local area networks, mobile communication networks, and combinations thereof.

Various implementations of the systems and techniques described here can be realized in a digital electronic circuitry, an integrated circuitry, a specific ASIC (application specific integrated circuits), computer hardware, firmware, software, and combinations thereof. These various embodiments may include: implemented in one or more computer programs, the one or more computer programs are executable and/or interpretable on a programmable system including at least one programmable processor and the programmable processor may be special or general programmable processor, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or subtended programming languages, and/or assembly/machine languages. As used herein, the terms "machine-readable medium" and "computer-readable medium" refer to any computer program product, apparatus and/or device (e.g. magnetic discs, optical disks, memory, Programmable Logic Devices (PLDs)) used to provide machine instructions or data to the programmable processor, including a machine-readable medium that receives machine instructions as a machine-readable signal. The term "machine-readable signal" refers to any signal used to provide machine instructions or data to the programmable processor.

To provide an interaction with a user, the systems and techniques described here can be implemented on a computer. The computer has: a display apparatus (e.g. a CRT (cathode ray tube) or an LCD (liquid crystal display) monitor) for displaying information to a user; and a keyboard and a pointing apparatus (e.g. a mouse or a trackball). A user may provide input to the computer through the keyboard and the pointing apparatus. Other kinds of apparatuses may also be used to provide the interaction with the user. For example, feedback provided to the user can be any form of sensory feedback (e.g. visual feedback, auditory feedback, or tactile feedback); and input from the user can be received in any form, including acoustic, speech, or tactile input.

The systems and techniques described here can be implemented in a computing system that includes a back-end component (e.g. as a data server), or that includes a middleware component (e.g. an application server), or that includes a front-end component (e.g. a user computer having a graphical user interface or a web browser through which a user can interact with an implementation of the systems and techniques described here), or any combination of such back-end, middleware, or front-end components. The components of the systems can be interconnected by any form or medium of digital data communication (e.g. a communication network). Examples of communication networks include: local area networks (LANs), wide area networks (WANs), and the Internet.

A computing system may include a client and a server. The client and the server are generally remote from each other and typically interact through a communication network. The relationship of the client and the server arises by virtue of computer programs running on the respective computers and having a client-server relationship to each other.

According to the technical solutions of the present application, when an autonomous vehicle and an oncoming vehicle converge, time points of entering a vehicle-converging area can be accurately predicted according to traveling conditions of two parties. Thus the traveling speed of the autonomous vehicle is controlled more accurately, and personal accidents and property loss caused by vehicle collision are avoided.

It should be appreciated that, using the processes of various forms shown above, steps may be reordered, added, or deleted. For example, the steps described in the present application may be executed in parallel, sequentially, or in different orders, which are not limited herein as long as the desired results of the technical solutions disclosed in the present application can be achieved.

The above specific implementations do not constitute a limitation on the protection scope of the present application. A person skilled in the art may appreciate that modifications, combinations, sub-combinations and substitutions can be made according to design requirements and other factors. Any modifications, equivalent substitutions and improvements made within the spirit and principle of the present application all should be included in the protection scope of the present application.

What is claimed is:

1. A method for planning an autonomous vehicle, comprising:
   acquiring first traveling information of an autonomous vehicle, wherein the first traveling information comprises a traveling track and a traveling parameter of the autonomous vehicle;
   acquiring second traveling information of at least one obstacle vehicle, wherein the second traveling information comprises position information and a traveling parameter of the obstacle vehicle;
   predicting a driving intention of the obstacle vehicle according to the acquired second traveling information of the obstacle vehicle;
   planning a vehicle-converging strategy for the autonomous vehicle according to the first traveling information and the driving intention of the obstacle vehicle upon determining that there is a possibility of vehicle-converging between the autonomous vehicle and the obstacle vehicle; and
   controlling the autonomous vehicle to travel according to the vehicle-converging strategy;
   wherein the predicting the driving intention of the obstacle vehicle according to the acquired second traveling information of the obstacle vehicle comprises:

computing, according to the acquired first traveling information of the autonomous vehicle, time when the autonomous vehicle enters a vehicle-converging area and time when the autonomous vehicle leaves the vehicle-converging area;

calculating an overtaking acceleration constraint and a yielding acceleration constraint of the obstacle vehicle according to the second traveling information of the obstacle vehicle and, at least one of the time when the autonomous vehicle enters the vehicle-converging area or the time when the autonomous vehicle leaves the vehicle-converging area; and predicting the driving intention of the obstacle vehicle based on the overtaking acceleration constraint and the yielding acceleration constraint of the obstacle vehicle;

wherein the predicting the driving intention of the obstacle vehicle according to the acquired second traveling information of the obstacle vehicle further comprises: estimating acceleration distribution of the obstacle vehicle according to acquired position information of the obstacle vehicle at each moment; and the predicting the driving intention of the obstacle vehicle based on the overtaking acceleration constraint and the yielding acceleration constraint of the obstacle vehicle comprises: predicting the driving intention of the obstacle vehicle by comparing the acceleration distribution with the overtaking acceleration constraint and the yielding acceleration constraint of the obstacle vehicle;

wherein the predicting the driving intention of the obstacle vehicle according to the acquired second traveling information of the obstacle vehicle comprises: dividing, according to the acquired second traveling information of the obstacle vehicle and a maximum value and a minimum value within a preset acceleration range, traveling of the obstacle vehicle before entering the vehicle-converging area into a preparation stage and a game stage, wherein an area corresponding to the game stage locates between the vehicle-converging area and an area corresponding to the preparation stage, and the area corresponding to the preparation stage is determined according to a speed of the obstacle vehicle; and predicting the driving intention of the obstacle vehicle according to the traveling parameter of the obstacle vehicle after entering the game stage.

2. The method according to claim 1, wherein the predicting the driving intention of the obstacle vehicle based on the overtaking acceleration constraint and the yielding acceleration constraint of the obstacle vehicle comprises:

acquiring an acceleration of the obstacle vehicle, and determining the driving intention by comparing the acceleration with an acceleration constraint for the driving intention of overtaking and an acceleration constraint for the driving intention of yielding.

3. The method according to claim 1, wherein the predicting the driving intention of the obstacle vehicle based on the overtaking acceleration constraint and the yielding acceleration constraint of the obstacle vehicle comprises:

determining that the driving intention is yielding, when it is calculated according to the second traveling information of the obstacle vehicle that the obstacle vehicle is accelerating and the overtaking acceleration constraint exceeds a preset acceleration range; and determining that the driving intention is overtaking, when it is calculated according to the second traveling information of the obstacle vehicle that the obstacle vehicle is decelerating and the yielding acceleration constraint exceeds a preset acceleration range.

4. The method according to claim 1, wherein the planning the vehicle-converging strategy for the autonomous vehicle according to the first traveling information and the driving intention of the obstacle vehicle comprises:

planning the autonomous vehicle to yield when the predicted driving intention of the obstacle vehicle is overtaking; and planning the autonomous vehicle to overtake when the predicted driving intention of the obstacle vehicle is yielding.

5. The method according to claim 1, wherein the planning the vehicle-converging strategy for the autonomous vehicle according to the first traveling information and the driving intention of the obstacle vehicle comprises:

updating, according to the driving intention of the obstacle vehicle, at least one of time when the obstacle vehicle enters the vehicle-converging area and time when the obstacle vehicle leaves the vehicle-converging area; and planning the autonomous vehicle to yield under a condition that the computed time when the autonomous vehicle enters the vehicle-converging area is later than the time when the obstacle vehicle enters the vehicle-converging area; otherwise, planning the autonomous vehicle to overtake.

6. The method according to claim 1, wherein the predicting the driving intention of the obstacle vehicle according to the traveling parameter of the obstacle vehicle after entering the game stage comprises:

comparing the overtaking acceleration constraint and the yielding acceleration constraint with the acceleration distribution of the obstacle vehicle and predicting the driving intention of the obstacle vehicle to be overtaking or yielding.

7. The method according to claim 1, wherein:

giving up an overtaking and passing by behavior under a condition that a speed required by the autonomous vehicle when accelerating to overtake and pass by exceeds a speed limit of a corresponding road; and giving up a yielding and passing by behavior under a condition that an acceleration required by the autonomous vehicle when yielding and passing by is smaller than a preset value.

8. A non-transitory computer readable storage medium having stored computer instructions, the computer instructions are configured to cause a computer to execute the method according to claim 1.

9. The method according to claim 1, wherein the planning the vehicle-converging strategy for the autonomous vehicle according to the first traveling information and the driving intention of the obstacle vehicle comprises:

computing, according to the acquired traveling parameter of the autonomous vehicle, a speed of the autonomous vehicle when entering the vehicle-converging area; predicting, according to the driving intention of the obstacle vehicle, a speed of the obstacle vehicle when entering the vehicle-converging area and updating at least one of time when the obstacle vehicle enters the vehicle-converging area and time when the obstacle vehicle leaves the vehicle-converging area; and planning the autonomous vehicle to overtake or yield according to the computed speed of the autonomous vehicle when entering the vehicle-converging area and the predicted speed of the obstacle vehicle when entering the vehicle-converging area, under a condition that a difference between the computed time when the autonomous vehicle enters the vehicle-converging area and the predicted time when the obstacle vehicle enters the vehicle-converging area is smaller than a preset value.

10. The method according to claim 9, wherein the planning the autonomous vehicle to overtake or yield according to the computed speed of the autonomous vehicle when entering the vehicle-converging area and the predicted speed of the obstacle vehicle when entering the vehicle-converging area comprises:

planning the autonomous vehicle to overtake and pass by under a condition that the computed speed of the autonomous vehicle when entering the vehicle-converging area is higher than the predicted speed of the obstacle vehicle when entering the vehicle-converging area; and planning the autonomous vehicle to yield and pass by under a condition that the computed speed of the autonomous vehicle when entering the vehicle-converging area is lower than the predicted speed of the obstacle vehicle when entering the vehicle-converging area.

11. An apparatus for planning an autonomous vehicle, comprising:

at least one processor; and
a memory communicatively connected to the at least one processor; wherein, the memory stores instructions executable by the at least one processor, and the instructions are executed by the at least one processor, so that the at least one processor is configured to:
acquire first traveling information of an autonomous vehicle, wherein the first traveling information comprises a traveling track and a traveling parameter of the autonomous vehicle;
acquire second acquire traveling information of at least one obstacle vehicle, wherein the second traveling information comprises position information and a traveling parameter of the obstacle vehicle;
predict a driving intention of the obstacle vehicle according to the acquired second traveling information of the obstacle vehicle;
plan a vehicle-converging strategy for the autonomous vehicle according to the first traveling information and the driving intention of the obstacle vehicle upon determining that there is a possibility of vehicle-converging between the autonomous vehicle and the obstacle vehicle; and
control the autonomous vehicle to travel according to the vehicle-converging strategy;
wherein the at least one processor is further configured to: compute, according to the acquired first traveling information of the autonomous vehicle, time when the autonomous vehicle enters a vehicle-converging area and time when the autonomous vehicle leaves the vehicle-converging area; calculate an overtaking acceleration constraint and a yielding acceleration constraint of the obstacle vehicle according to the second traveling information of the obstacle vehicle and, at least one of the time when the autonomous vehicle enters the vehicle-converging area or the time when the autonomous vehicle leaves the vehicle-converging area; and predict the driving intention of the obstacle vehicle based on the overtaking acceleration constraint and the yielding acceleration constraint of the obstacle vehicle;

wherein the at least one processor is further configured to: estimate acceleration distribution of the obstacle vehicle according to acquired position information of the obstacle vehicle at each moment; and predict the driving intention of the obstacle vehicle by comparing the acceleration distribution with the overtaking acceleration constraint and the yielding acceleration constraint of the obstacle vehicle;

wherein the at least one processor is further configured to: divide, according to the acquired second traveling information of the obstacle vehicle and a maximum value and a minimum value within a preset acceleration range, traveling of the obstacle vehicle before entering the vehicle-converging area into a preparation stage and a game stage, wherein an area corresponding to the game stage locates between the vehicle-converging area and an area corresponding to the preparation stage, and the area corresponding to the preparation stage is determined according to a speed of the obstacle vehicle; and predict the driving intention of the obstacle vehicle according to the traveling parameter of the obstacle vehicle after entering the game stage.

12. The apparatus according to claim 11, wherein the at least one processor is further configured to:
acquire an acceleration of the obstacle vehicle, and determine the driving intention by comparing the acceleration with an acceleration constraint for the driving intention of overtaking and an acceleration constraint for the driving intention of yielding.

13. The apparatus according to claim 11, wherein the at least one processor is further configured to:
determine that the driving intention is yielding, when it is calculated according to the second traveling information of the obstacle vehicle that the obstacle vehicle is accelerating and the overtaking acceleration constraint exceeds a preset acceleration range; and
determine that the driving intention is overtaking, when it is calculated according to the second traveling information of the obstacle vehicle that the obstacle vehicle is decelerating and the yielding acceleration constraint exceeds a preset acceleration range.

14. The apparatus according to claim 11, wherein the at least one processor is further configured to:
plan the autonomous vehicle to yield when the predicted driving intention of the obstacle vehicle is overtaking; and
plan the autonomous vehicle to overtake when the predicted driving intention of the obstacle vehicle is yielding.

15. The apparatus according to claim 11, wherein the at least one processor is further configured to:
update, according to the driving intention of the obstacle vehicle, at least one of time when the obstacle vehicle enters the vehicle-converging area and time when the obstacle vehicle leaves the vehicle-converging area; and
plan the autonomous vehicle to yield under a condition that the computed time when the autonomous vehicle enters the vehicle-converging area is later than the time when the obstacle vehicle enters the vehicle-converging area; otherwise, plan the autonomous vehicle to overtake.

16. The apparatus according to claim 11, wherein the at least one processor is further configured to:

compute, according to the acquired traveling parameter of the autonomous vehicle, a speed of the autonomous vehicle when entering the vehicle-converging area;

predict, according to the driving intention of the obstacle vehicle, a speed of the obstacle vehicle when entering the vehicle-converging area and update at least one of time when the obstacle vehicle enters the vehicle-converging area and time when the obstacle vehicle leaves the vehicle-converging area; and plan the autonomous vehicle to overtake or yield according to the computed speed of the autonomous vehicle when entering the vehicle-converging area and the predicted speed of the obstacle vehicle when entering the vehicle-converging area, under a condition that a difference between the computed time when the autonomous vehicle enters the vehicle-converging area and the predicted time when the obstacle vehicle enters the vehicle-converging area is smaller than a preset value.

17. The apparatus according to claim 16, wherein the at least one processor is further configured to:

plan the autonomous vehicle to overtake and pass by under a condition that the computed speed of the autonomous vehicle when entering the vehicle-converging area is higher than the predicted speed of the obstacle vehicle when entering the vehicle-converging area; and plan the autonomous vehicle to yield and pass by under a condition that the computed speed of the autonomous vehicle when entering the vehicle-converging area is lower than the predicted speed of the obstacle vehicle when entering the vehicle-converging area.

18. The apparatus according to claim 11, wherein the at least one processor is further configured to:

after the obstacle vehicle entering the game stage, compare the overtaking acceleration constraint and the yielding acceleration constraint with the acceleration distribution of the obstacle vehicle and predict the driving intention of the obstacle vehicle to be overtaking or yielding.

19. The apparatus according to claim 11, wherein the at least one processor is further configured to:

give up an overtaking and passing by behavior under a condition that a speed required by the autonomous vehicle when accelerating to overtake and pass by exceeds a speed limit of a corresponding road; and give up a yielding and passing by behavior under a condition that an acceleration required by the autonomous vehicle when yielding and passing by is smaller than a preset value.

* * * * *